United States Patent [19]

Park

[11] Patent Number: 4,825,211
[45] Date of Patent: Apr. 25, 1989

[54] WARNING DEVICE FOR VEHICLES AGAINST AN APPROACHING OBJECTS

[75] Inventor: Byung-Young Park, Seoul, Rep. of Korea

[73] Assignee: Poong-Kyu Lee, Seoul, Rep. of Korea; a part interest

[21] Appl. No.: 108,590

[22] Filed: Oct. 14, 1987

[30] Foreign Application Priority Data

Mar. 28, 1987 [KR] Rep. of Korea ............ 1987-4066[U]
Jul. 16, 1987 [KR] Rep. of Korea .......... 1987-11703[U]

[51] Int. Cl.$^4$ .............................................. G08G 1/00
[52] U.S. Cl. ................................... 340/901; 340/903; 340/435; 340/555; 455/605; 180/167
[58] Field of Search ................ 340/901, 903, 942, 51, 340/61, 555, 556; 455/604–606, 613; 180/167

[56] References Cited

U.S. PATENT DOCUMENTS

| | | | |
|---|---|---|---|
| 3,605,082 | 9/1971 | Matthews | 340/556 |
| 3,840,848 | 10/1975 | Marshall et al. | 340/901 |
| 4,207,466 | 6/1980 | Drage et al. | 340/556 |
| 4,398,172 | 8/1983 | Carroll et al. | 455/604 |
| 4,433,328 | 2/1984 | Saphir et al. | 340/555 |

FOREIGN PATENT DOCUMENTS

3322528 1/1985 Fed. Rep. of Germany .
3420004 12/1985 Fed. Rep. of Germany .

Primary Examiner—Donnie L. Crosland
Attorney, Agent, or Firm—Hill, Van Santen, Steadman & Simpson

[57] ABSTRACT

A warning device for use on a vehicle for sensing an approaching object when the vehicle is moving backward. The device produces a first signal when the object is in remote proximity of the vehicle and at least a second signal when the object is in close proximity of the vehicle. The device has a circuit for emitting intermittent infrared light when the vehicle is moving backward and a circuit for receiving the infrared light reflected from the object. The circuit for receiving produces a receive signal indicative of the received infrared light. The device further has an output of the circuit for receiving connected to two inverting inputs of both first and second differential amplifiers, inverting inputs of the first and second differential amplifiers being connected by a first and second variable resistors, respectively, to an applied voltage. First and second outputs of the first and second differential amplifiers, respectively, are connected to first and second inputs of an AND gate. An output of the AND gate is connected to a circuit for producing the second signal and the output of the first differential amplifier is connected to a circuit for producing the first signal.

9 Claims, 2 Drawing Sheets

WARNING DEVICE FOR VEHICLES AGAINST AN APPROACHING OBJECTS

BACKGROUND OF THE INVENTION

1. Field of the Invention

The present invention generally relates to a warning device for vehicles which serves the purpose of promptly warning a driver of an object that approaches the vehicles.

2. Description of the Prior Art

Conventionally, such a warning device for vehicles has been proposed in order to provide for safe driving of the vehicle, and thus prevent possible accidents and the loss of properties and human lives. In such a conventional device, an infrared light-emitting diode is disposed at one side of the vehicle. As a current is intermittently supplied to the diode, an infrared light is emitted. When an object approaches the vehicle, the infrared light is reflected, and this reflected wave is received by a receiving diode. Then, a signal from the receiving diode is amplified by means of inverting and non-inverting differential amplifiers, and thereafter rectified. This rectified output is applied to an inverting differential amplifier, so that a voltage with a proper DC level is generated. As this generated voltage actuates the transistor, an LED is lit. At the same time, a warning from a melody speaker is generated by a melody generator, so that the driver can promptly recognize that an object is approaching the vehicle.

However, such a warning device may malfunction due to infrared lights contained in the sun light or generated from remote controllers for household electrical appliances. Thereby, there is a problem of lowered reliability of the warning device. Even when an object is close to the vehicle, about which the driver has to promptly take an action, such as a stop action, a warning melody is generated constantly, so that the driver may not recognize such condition immediately. Thereby, there is a problem of a possibility of causing accidents.

SUMMARY OF THE INVENTION

Therefore, an object of the present invention is to eliminate the above-mentioned disadvantages encountered in the prior art and to provide a warning device for vehicles of an approaching object which improves the reliability thereof.

In accordance with the present invention, this object can be accomplished by providing a warning device for a vehicle of an approaching object comprising; a transistor receiving an oscillating voltage; infrared light-emitting diodes intermittently receiving a current as the oscillating voltage is applied to the transistor; receiving diodes, an inverting differential amplifier, a non-inverting differential amplifier; a rectifier, an inverting differential amplifier, all of said elements being connected in series; and a second transistor connected at the base thereof to an output of the inverting differential amplifier, the device further having a pair of unstable multi-vibrators, one of the multi-vibrators being connected at the output terminal thereof to the reset terminal of the other one, the output terminal of which is connected to the base of the transistor; a band-pass filter connected between the non-inverting differential amplifier and the rectifier; and AND gate connected to the output terminal of the unstable multivibrator and the output of the second transistor, via a third transistor; a pair of non-inverting differential amplifiers adapted to receive an rectified output from the AND gate; a second AND gate connected to outputs of the non-inverting differential amplifiers; a buzzer and a LED adapted to actuate by an output from the second AND gate; and an oscillator-controlling transistor connected to the output of said the non-inverting differential amplifier, said transistor connected to a speaker.

BRIEF DESCRIPTION OF THE DRAWINGS

These and other objects of the invention will be seen by reference to the description, taken in conjunction with the accompanying drawings, in which.

DETAILED DESCRIPTION OF THE PREFERRED EMBODIMENTS

Figure 1:
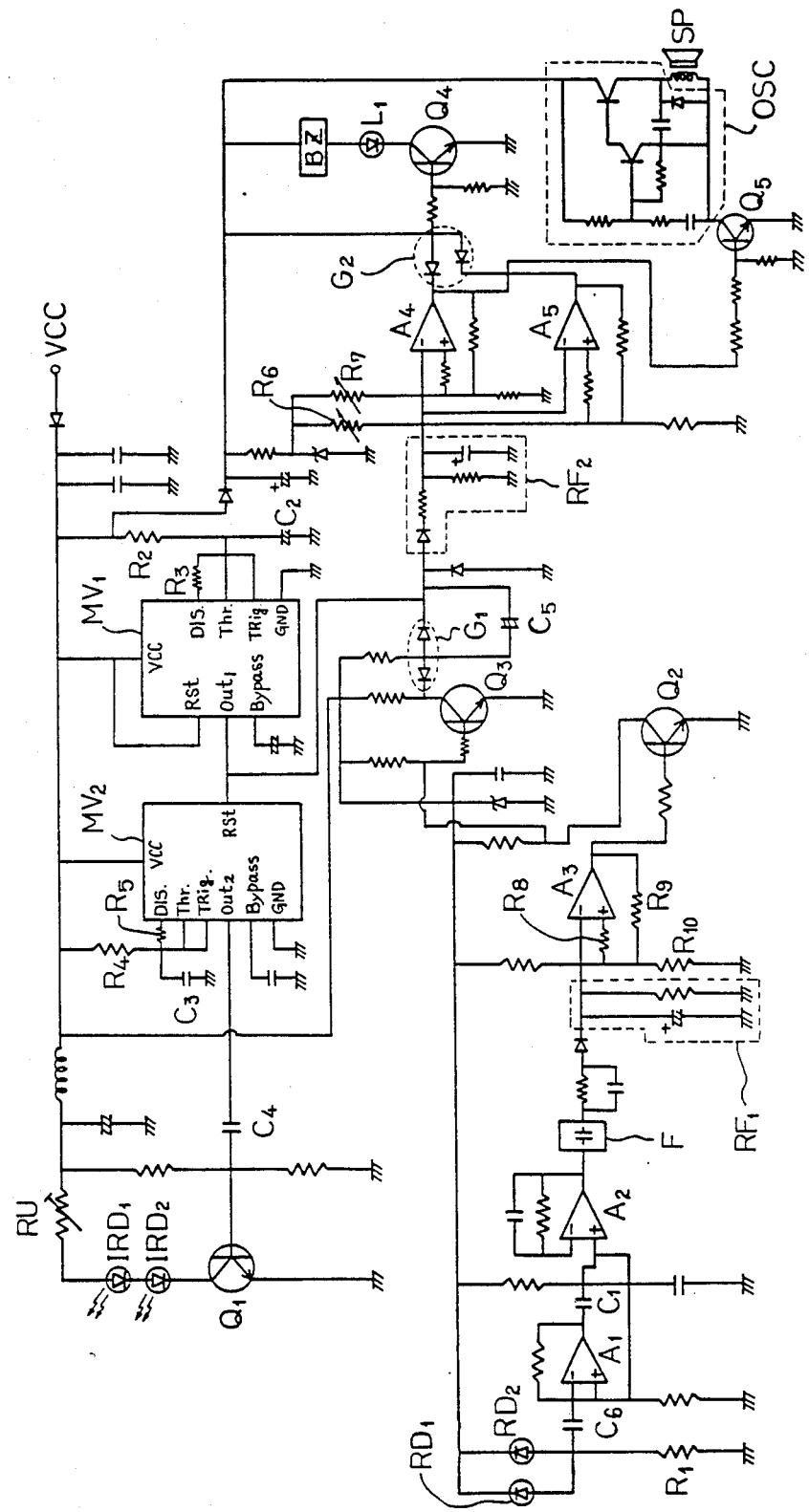
FIG. 1 is a circuit diagram of a warning device in accordance with the present invention.

Referring to FIG. 1, a circuit of the present invention is shown, which includes two infrared light-emitting diodes $IRD_1$ and $IRD_2$ connected between a terminal of an electric power supply VCC and a collector of a transistor $Q_1$. As an oscillating voltage is applied to the base of a transistor $Q_1$, a current can intermittently flow into infrared light-emitting diodes $IRD_1$ and $IRD_2$.

To both ends of the electric power supply, receiving diodes $RD_1$ and $RD_2$, and a resistance $R_1$ are connected, as shown and their connection is connected to an inverting input of an differential amplifier $A_1$. The output of the inverting differential amplifier $A_1$ is connected to an input of a non-inverting differential amplifier $A_2$, via a condenser $C_1$. The output of the non-inverting differential amplifier $A_2$ is connected to an input of an inverting differential amplifier $A_3$, via a rectifier $RF_1$. By the output from the inverting differential amplifier $A_3$, a transistor $Q_2$ is actuated.

In accordance with the present invention, the circuit includes unstable multi-vibrators $MV_1$ and $MV_2$ which are connected with resistance $R_2$, $R_3$, $R_4$ and $R_5$ and condensers $C_2$ and $C_3$. One of the unstable multi-vibrators $MV_1$ and $MV_2$ is connected at the output terminal $out_1$ thereof to the reset terminal Rst of the other one. The other multi-vibrator is connected at the output terminal $out_2$ thereof to the base of the transistor $Q_1$ via a condenser $C_4$. A band-pass filter F which includes a condenser and a resistance is connected between the non-inverting differential amplifier $A_2$ and the rectifier $RF_1$. The output from the transistor $Q_2$ is applied to the base of another transistor $Q_3$. The collector of the transistor $Q_3$ is connected to AND gate $G_1$, together with the output terminal $out_1$ of the unstable multi-vibrator $MV_1$. The output of AND gate $G_1$ is connected to a rectifier $RF_2$, via a condenser $C_5$. The output of the rectifier $RF_2$ is connected to non-inverting terminals of non-inverting differential amplifiers $A_4$ and $A_5$ in which the applied voltage of invert terminals are varied by resistance $R_6$ and $R_7$.

The output of non-inverting differential amplifiers $A_4$ and $A_5$ are connected to AND gate $G_2$, the output of which is connected to a LED $L_1$ and a buzzer BZ which are actuated by the transistor $Q_4$. The output of the non-inverting differential amplifier $A_4$ is connected to the base of the transistor $Q_5$, thereby permitting a power to be supplied to the oscillator OSC having connected thereto a speaker SP.

In the drawings, reference numerals $R_8$, $R_9$ and $R_{10}$ are resistances, $R_{11}$ a semi-fixing resistance, and $C_6$ a condenser.

When the above-mentioned circuit is lused as a warning device in the case of the backward movement of a vehicle, the limit switch has to be adjusted such that the contact thereof (not shown) is in an "ON" state when the lever of the transmission is in the reverse position. Also, infrared light-emitting diodes $IRD_1$ and $IRD_2$ and receiving diodes $RD_1$ and $RD_2$ have to be disposed at the rear of the vehicle.

In the reverse position, accordingly, a power is supplied to the circuit of the present invention, via the contact of the limit switch. At the same time, an infrared light is emitted at the rear of the vehicle.

At this time, an output with a relatively low frequency is generated from the output terminal $out_1$ of the unstable multi-vibrator $MV_1$, particularly, by means of the resistance $R_2$ and $R_3$, and the condenser $C_2$. This output is applied to the reset terminal Rst of the unstable multi-vibrator $MV_2$ which oscillates with a high frequency by means of the resistances $R_4$ and $R_5$, and condenser $C_3$.

Figure 2:
FIG. 2 is a wave plot of a current flowing through a infrared light-emitting diode in accordance with the present invention.

Therefore, when the output of the unstable multi-vibrator $MV_1$ is "0", the output of the unstable multi-vibrator $MV_2$ is also "0". And also, when the output of the unstable multi-vibrator $MV_1$ is "1", the output of the unstable multi-vibrator $MV_2$ is "1". Consequently, a modified wave form as depicted in FIG. 2 is output from the output terminal $out_2$. This output is applied to the base of the transistor $Q_1$, via the condenser $C_4$.

Accordingly, a current as depicted in FIG. 2 flows into the infrared light-emitting diodes $IRD_1$ and $IRD_2$ connected to the collector of the transistor $Q_1$. Thus, the emitted infrared light has also a modified wave form.

When no object is approaching to the rear of the vehicle from which the infrared light under the above-mentioned condition is emitted, there is no reflected wave received by the receiving diodes $RD_1$ and $RD_2$. Accordingly, there is no signal voltage which can pass through the condenser $C_6$, so that the output wave form of the differential amplifier $A_1$ is not varied. Therefore, oscillator OSC, LED $L_1$, and buzzer BZ remain under the non-actuating condition.

Figure 3:
FIG. 3 is a wave plot of a voltage applied to an AND gate (G1) in FIG. 1 in accordance with the present invention.

If an object is approaching the rear of the vehicle, then the emitted infrared light is reflected by the object and received by the receiving diodes $RD_1$ and $RD_2$. At this time, the wave form of the current flowing through the receiving diodes $RD_1$ and $RD_2$ becomes the form as depicted in FIG. 2. Therefore, this current passes through the condenser $C_6$ and the amplifier $A_1$, where the current is inversely amplified. Then, the amplified current is applied to the non-inverting amplifier $A_2$, via the condenser $C_1$. Since a voltage of the power supply is simultaneously applied to the non-inverting amplifier $A_2$, the applied current has an increased amplitude voltage and is amplified to a significant high level. Then, the band pass filter F selectively passes the oscillating frequency of the unstable multi-vibrator $MV_2$. The signal obtained from the band pass filter F is then rectified and, thereafter, applied to the inverting terminal of the inverting differential amplifier $A_3$. At this time, the applied voltage is under the same condition as that from the output terminal $out_1$ of the unstable multi-vibrator $MV_1$, as shown in FIG. 3.

This voltage with a high level is much higher than the input voltage of the non-inverting terminal passing through resistances $R_8$, $R_9$ and $R_{10}$. Accordingly, the output voltage is under the low level condition, so that transistors $Q_2$ and $Q_3$ repeat "turn on" and "turn off" states. Thus, a voltage wave form as depicted in FIG. 3 is generated in the collector of the above transistors.

Therefore, AND gate $G_1$ receives at both ends thereof the voltages, the wave form of which represents "0" and "1", respectively. And also, the generated output has the voltage wave form as depicted in FIG. 3. This output is applied to the rectifier $RF_2$, via the condenser $C_5$. Accordingly, the rectified series flat signal voltage with a certain level is applied to the non-inverting terminals of the non-inverting differential amplifiers $A_4$ and $A_5$.

At this time, a control of the applied voltage by the resistances $R_6$ and $R_7$ has to be carried out at the inverting terminals of the non-inverting differential amplifiers $A_4$ and $A_5$. For example, the output voltage of the differential amplifier $A_4$ is controlled to have a high level, when the rectifier $RF_2$ has an output voltage of 2 V. When the output voltage is 3.9 V or more, on the other hand, the output voltages of both differential amplifiers $A_4$ and $A_5$ have a high level.

Therefore, when the rectifier $RF_2$ has an output voltage of 2.5 V, the output voltage of the differential amplifier $A_4$ becomes a high level, so that the transistor $Q_5$ becomes "turn on", thereby permitting a power to be supplied to the oscillator OSC. As the oscillator OSC starts the oscillating operation thereof, an oscillating melody is generated from the speaker SP, so that the driver can recognize the appearance of the obstacle within the sensing distance from the rear of the vehicle.

When the obstacle is close to the driven vehicle, the reflected wave becomes strong, so that the rectifier $RF_2$ generates a high voltage of 3.9 V or more in the above-mentioned manner. Accordingly, the outputs of both differential amplifiers $A_4$ and $A_5$ which are connected to inputs of AND gate $G_2$ become a high level, thereby causing the transistor $Q_4$ to be in the conductive state. Then, a current can flow into LED $L_1$ and the buzzer BZ, so that together with the generation of the oscillating melody from the speaker SP, LED $L_1$ can light and the buzzer BZ can generate a melody. Thus, the driver can recognize the fact that an obstacle is closely approached to the rear of the vehicle, and then immediately take a suitable action.

When the obstacle is away from the sensing distance, on the other hand, there is no reflected wave received by the receiving diodes $RD_1$ and $RD_2$. Therefore, no signal voltage passes through the condenser $C_6$, and thus, through the condenser $C_1$. Accordingly, the output of the non-inverting differential amplifier $A_2$ can not pass the band-pass filter F, so that the output of the inverting differential amplifier $A_3$ becomes a high level. Thus, the transistor $Q_2$ continuously maintains the "turn off" state thereof, while the transistor $Q_3$ continuously maintains the "turn on" state. Accordingly, the output of AND gate $G_1$ becomes "0" level, so that no output is generated from the rectifier $RF_2$ and the non-inverting differential amplifiers $A_4$ and $A_5$. Thus, anyone of the buzzer BZ, LED $L_1$, the speaker SP can not actuate so that the driver can recognize the fact that there is no obstacle at the rear of the vehicle and the driver can then safely drive the vehicle.

In accordance with the present invention, the infrared light-emitting diodes $IRD_1$ and $IRD_2$ and the receiving diodes $RD_1$ and $RD_2$ can be disposed at the front or the side of the vehicle, as well as the rear of the vehicle, in order to monitor both the front and the side of the vehicle.

By controlling the value of the resistance $R_{11}$, the current flowing through the infrared light-emitting diodes $IRD_1$ and $IRD_2$ can be adjusted, thereby enabling the sensing distance to be adjusted. Each number of the infrared light-emitting diodes and the receiving diodes may be increased or decreased, depending upon the sensing angle.

As apparent from the above-mentioned description, the warning device of the present invention provides for the safe driving of the vehicle by permitting the driver to recognize whether an object is approaching the vehicle or not. Particularly, any mal-function of the warning device can be completely avoided by the emission of the modified infrared light from two unstable multi-vibrators and the provision of the band-pass filter and the AND gate, thereby enabling the reliability of the warning device to be improved.

By the warning device of the present invention, the driver can also recognize when an object is closely approaching the vehicle, so that a possible accident can be avoided.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A warning device for use on a vehicle for sensing an approaching object when the vehicle is moving backward, the device producing a first signal when the object is in remote proximity to the vehicle and at least a second signal when the object is in close proximity to the vehicle, the device having a first transistor for receiving on a base thereof an oscillating voltage, a pair of first and second unstable multivibrators said first multivibrator having an output terminal connected to a reset terminal of said second multivibrator, an output terminal of said second multivibrator connected to said base of said first transistor thereby supplying said oscillating voltage, at least one infrared light-emitting diode connected in series with a collector emitter path of said first transistor, said oscillating voltage on said base of said first transistor causing said first transistor to switch on and off thereby providing an intermittent current flowing in said infrared light-emitting diode to produce an intermittent infrared light therefrom, a series circuit having at least one infrared light receiving diode connected to a first inverting amplifier which in turn is connected to a second non-inverting amplifier, which in turn is connected to a band-pass filter, which in turn is connected to a rectifier, and which in turn is connected to a third inverting amplifier, said receiving diode receiving said infrared light reflected by the object from said infrared light-emitting diode, when the object approaches the vehicle, a second transistor having a base connected to an output of said third inverting amplifier, a first AND gate having a first input connected to said output terminal of said first multivibrator and a second input connected to a collector emitter path of said second transistor via a third transistor, said second input of said first AND gate connected to said collector emitter path of said third transistor and a base of said thrid transistor connected to a collector emitter path of said second transistor, comprising:

an output of said first AND gate connected to noninverting inputs of both first and second differential amplifiers, inverting inputs of said first and second differential amplifiers being connected via first and second variable resistors, respectively, to an applied voltage;

first and second outputs of said first and second differential amplifiers, respectively, connected to first and second inputs of a second AND gate;

an output of said second AND gate connected to a means for producing the second signal and said output of said first differential amplifier connected to a means for producing the first signal.

2. The device of claim 1, wherein said means for producing said second signal is at least a buzzer and a light-emitting diode each connected to said output of said second AND gate and actuated when an output signal is present on said output of said second AND gate; and wherein said means for producing said first signal is an oscillator controlling transistor having its base connected to said output of said first differential amplifier and having a speaker connected to a collector emitter path thereof, said oscillator controlling transistor actuated by an output signal appearing on said output of said first differential amplifier.

3. The device of claim 1, wherein said device further comprises a second rectifier connected in series between said output of said first AND gate and said noninverting inputs of said first and second differential amplifiers, wherein an output level of said second rectifier is higher when said object is in close proximity than when said object is in remote proximity and wherein said first and second variable resistors are adjusted to produce different levels of voltage on said inverting inputs of said first and second differential amplifiers so as to cause an output signal only by said first differential amplifier when said object is in remote proximity and to cause an output by both said first and second differential amplifiers when said object is in close proximity.

4. A warning device for use on a vehicles for sensing an approaching object when the vehicle is moving backward, the device producing a first signal when the object is in remote proximity to the vehicle and at least a second signal when the object is in close proximity to the vehicle, comprising:

first transistor for receiving on a base thereof an oscillating voltage;

a pair of first and second unstable multivibrators, said first multivibrator having an output terminal connected to a reset terminal of said second multivibrator, an output terminal of said second multivibrator connected to said base of said first transistor thereby supplying said oscillating voltage;

at least one infrared light-emitting diode connected in series with a collector in series with a collector emitter path of said first transistor, said oscillating voltage on said base of said first transistor causing said first transistor to switch on and off thereby providing an intermittent current flowing in said infrared light-emitting diode to produce an intermittent infrared light therefrom;

series circuit having at least on infrared light receiving diode, connected to a first inverting amplifier, which in turn is connected to a second noninverting amplifier, which in turn is connected to a bandpass filter, which in turn is connected to a rectifier, and which in turn is connected to a third inverting amplifier, said receiving diode receiving said infrared light, reflected by the object, from said infrared light-emitting diode, when the object approaches the vehicle;

second transistor having a base connected to an output of said third inverting amplifier;

first AND gate having a first input connected to said output terminal of said first multivibrator and a second input connected to a collector emitter path of said second transistor via a third transistor, said second input of said first AND gate connected to said collector emitter path of said third transistor and a base of said third transistor connected to a collector emitter path of said second transistor;

an output of said first AND gate connected to noninverting inputs of both first and second differential amplifiers, inverting inputs of said first and second differential amplifiers being connected via first and second variable resistors, respectively, to an applied voltage;

first and second outputs of said first and second differential amplifiers, respectively, connected to first and second inputs of a second AND gate;

an output of said second AND gate connected to a means for producing the second signal and said output of said first differential amplifier connected to a means for producing the first signal.

5. The device of claim 4, wherein said means for producing said second signal is at least a buzzer and a light-emitting diode each connected to said output of said second AND gate and actuated when an output signal is present on said output of said second AND gate; and wherein said means for producing said first signal is an oscillator controlling transistor having its base connected to said output of said first differential amplifier annd having a speaker connected to a collector emitter path thereof, said oscillator controlling transistor actuated by an output signal appearing on said output of said first differential amplifier.

6. The device of claim 4, wherein said device further comprises a second rectifier connected in series between said output of said first AND gate and said noninverting inputs of said first and second differential amplifiers, wherein an output level of said second rectifier is higher when said object is in close proximity than when said object is in remote proximity and wherein said first and second variable resistors are adjusted to produce different levels of voltage on said inverting inputs of said first and second differential amplifiers so as to cause an output signal only by said first differential amplifier when said object is in remote proximity and to cause an output by both said first and second differential amplifiers when said object is in close proximity.

7. A warning device for use on a vehicle for sensing an approaching object when the vehicle is moving backward, the device producing a first signal when the object is in remote proximity to the vehicle and at least a second signal when the object is in close proximity to the vehicle, comprising:

means for emitting intermittent infrared light when the vehicle in moving backward;

means for receiving said infrared light, said infrared light being reflected from the object, said means for receiving having an output for outputting a receive signal indicative of said infrared light being reflected;

said output of said means for receiving connected to noninverting inputs of both first and second differential amplifiers, inverting inputs of said first and second differential amplifiers being connected via first and second variable resistors, respectively, to an applied voltage;

first and second outputs of said first and second differential amplifiers, respectively, connected to first and second inputs of a second AND gate;

an output of said second AND gate connected to a means for producing the second signal and said output of said first differential amplifier connected to a means for producing the first signal.

8. The device of claim 7, wherein said means for producing said second signal is at least a buzzer and a light-emitting diode each connected to said output of said second AND gate and actuated when an output signal is present on said output of said second AND gate; and wherein said means for producing said first signal is an oscillator controlling transistor having its base connected to said output of said first differential amplifier and having a speaker connected to a collector emitter path thereof, said oscillator controlling transistor actuated by an output signal appearing on said output of said first differential amplifier.

9. The device of claim 7, wherein said device further comprises a second rectifier connected in series between said output of said means for receiving said noninverting inputs of said first and second differential amplifiers, wherein an output level of said second rectifier is higher when said object is in close proximity than when said object is in remote proximity and wherein said first and second variable resistors are adjusted to produce different levels of voltage on said inverting inputs of said first and second differential amplifiers so as to cause an output signal only by said first differential amplifier when said object is in remote proximity and to cause an output by both said first and second differential amplifiers when said object is in close proximity.

* * * * *